July 2, 1963 T. E. MAESTAS 3,096,277
ELECTROSTATIC SEPARATOR
Filed March 27, 1961 6 Sheets-Sheet 1

INVENTOR.
Thomas E. Maestas
BY WHITEHEAD, VOGL & LOWE
PER *Frank C. Lowe*
ATTORNEYS

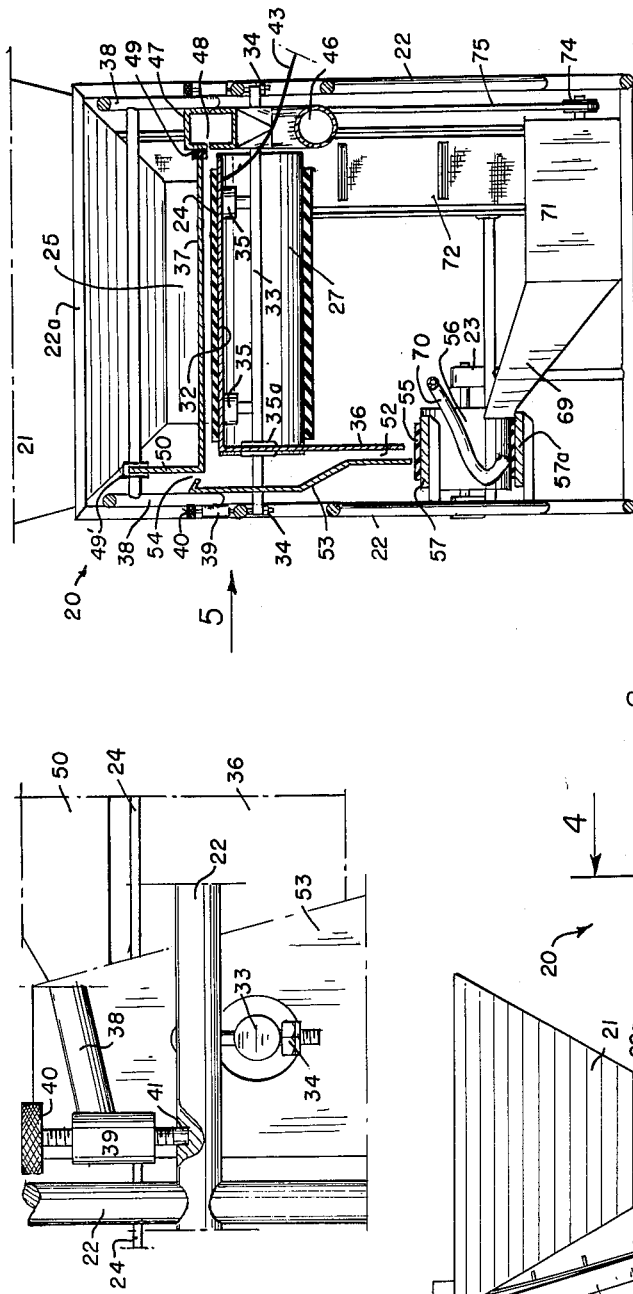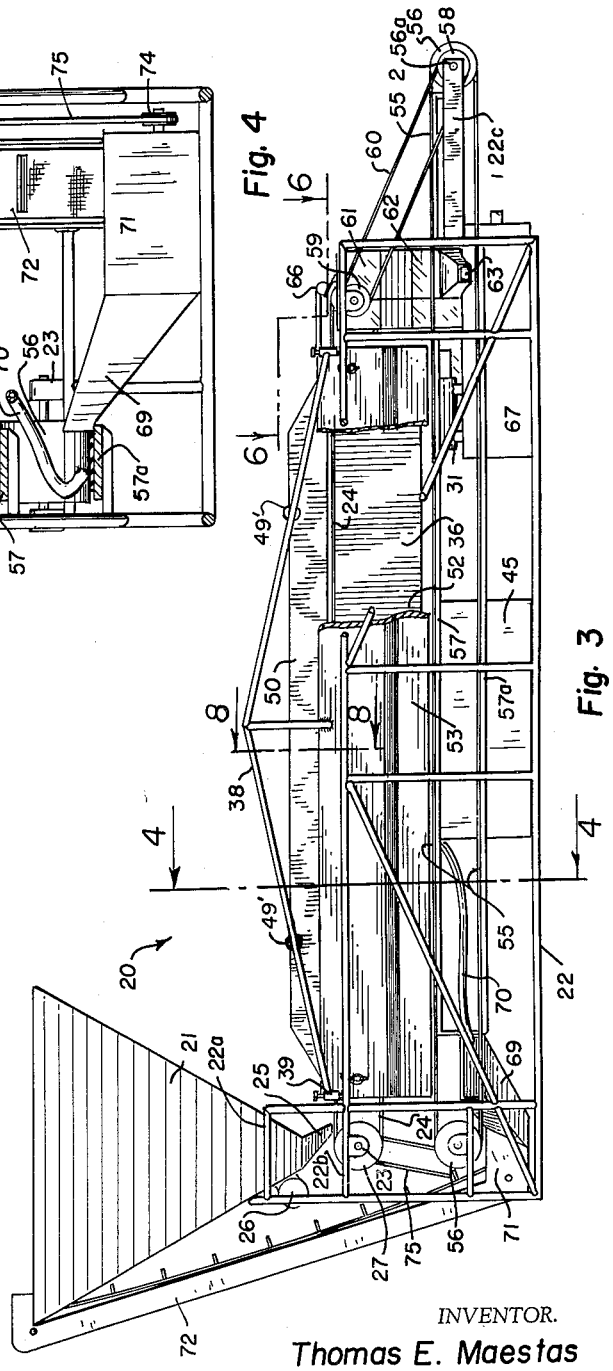

July 2, 1963　　　T. E. MAESTAS　　　3,096,277
ELECTROSTATIC SEPARATOR
Filed March 27, 1961　　　　　　　　　　　　6 Sheets-Sheet 3
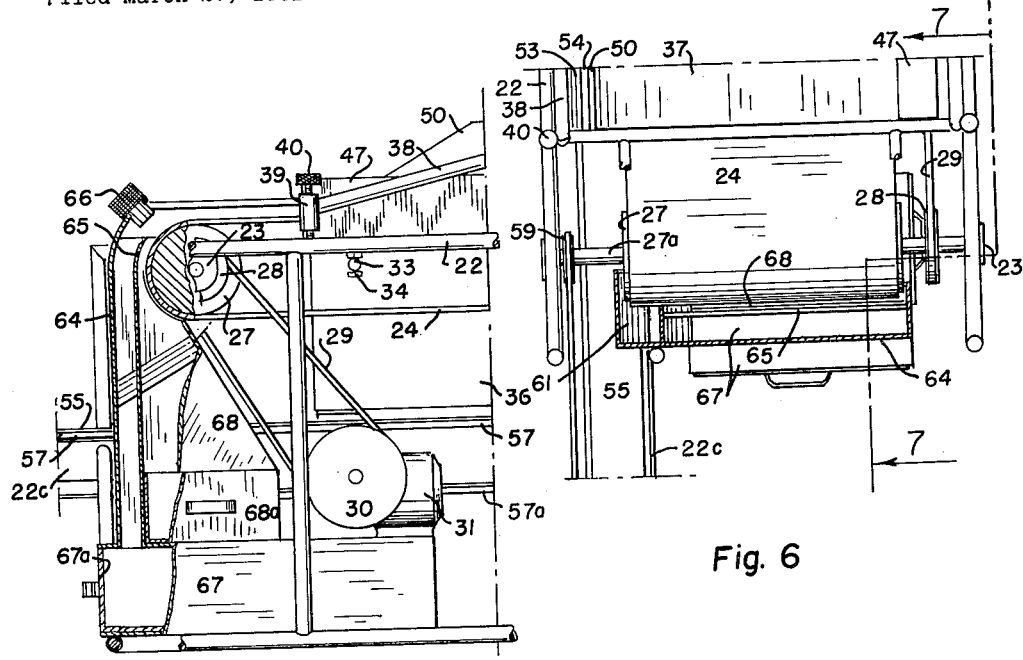
Fig. 6
Fig. 7
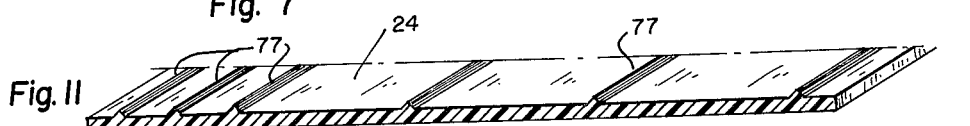
Fig. 11
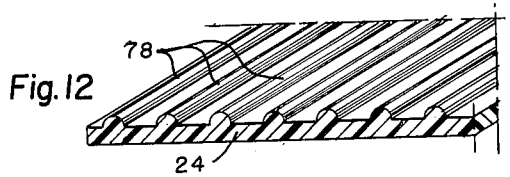
Fig. 12
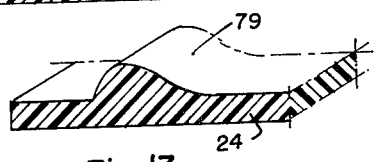
Fig. 13
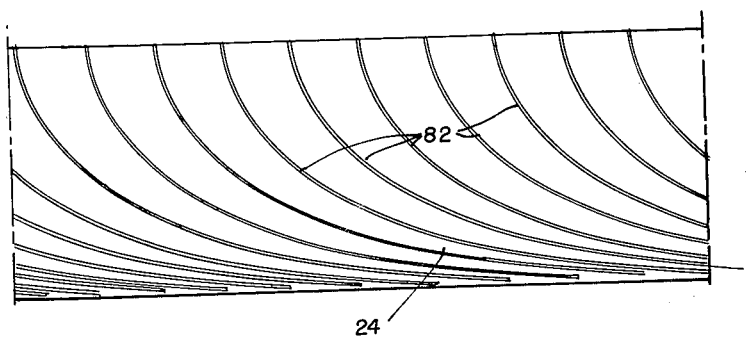
Fig. 16
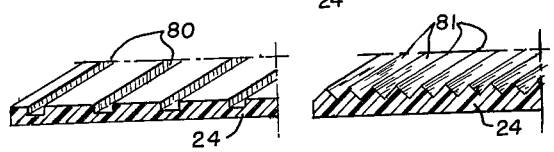
Fig. 14　　　Fig. 15
INVENTOR.
Thomas E. Maestas
BY WHITEHEAD, VOGL & LOWE
PER *Frank C. Lowe*
ATTORNEYS

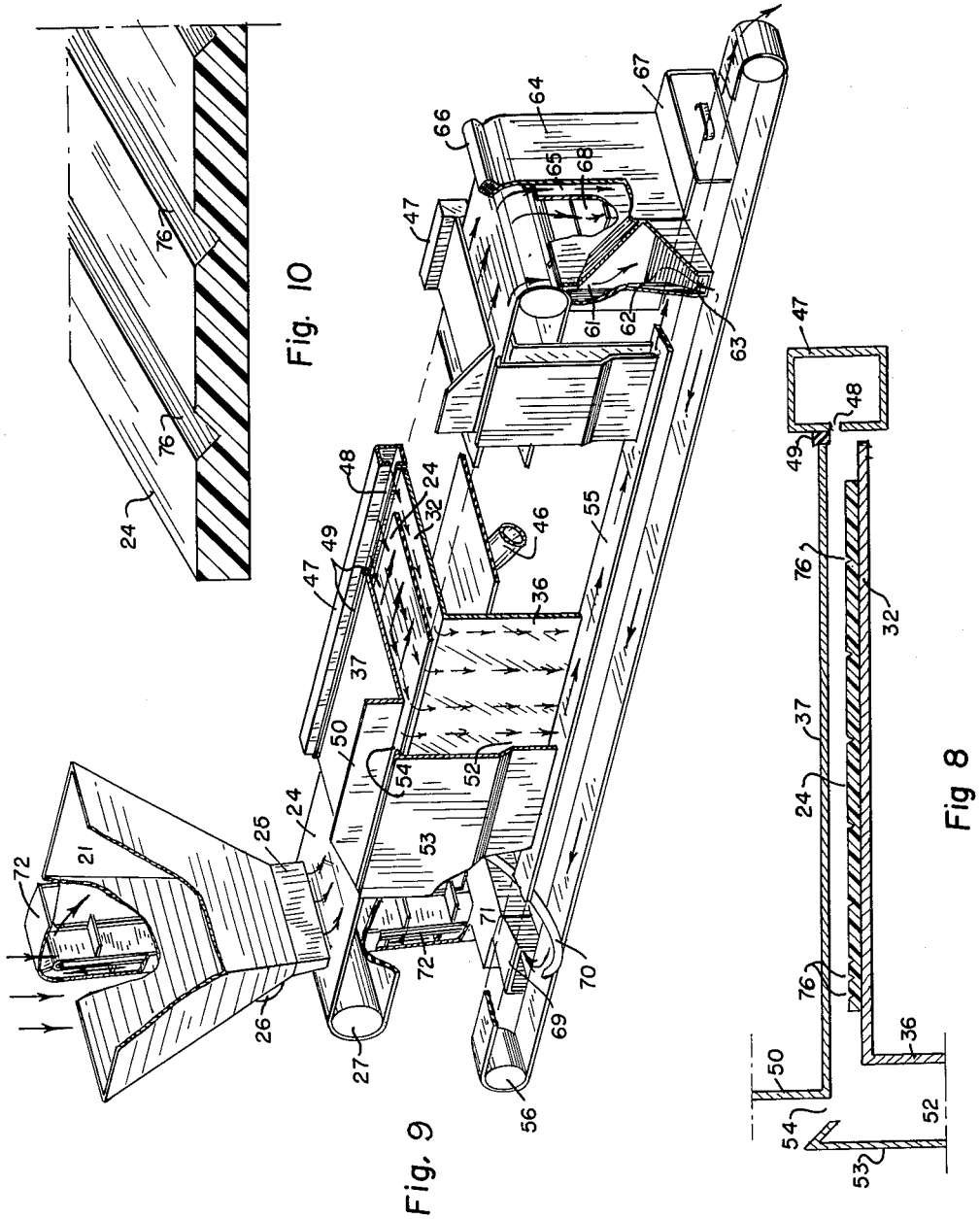

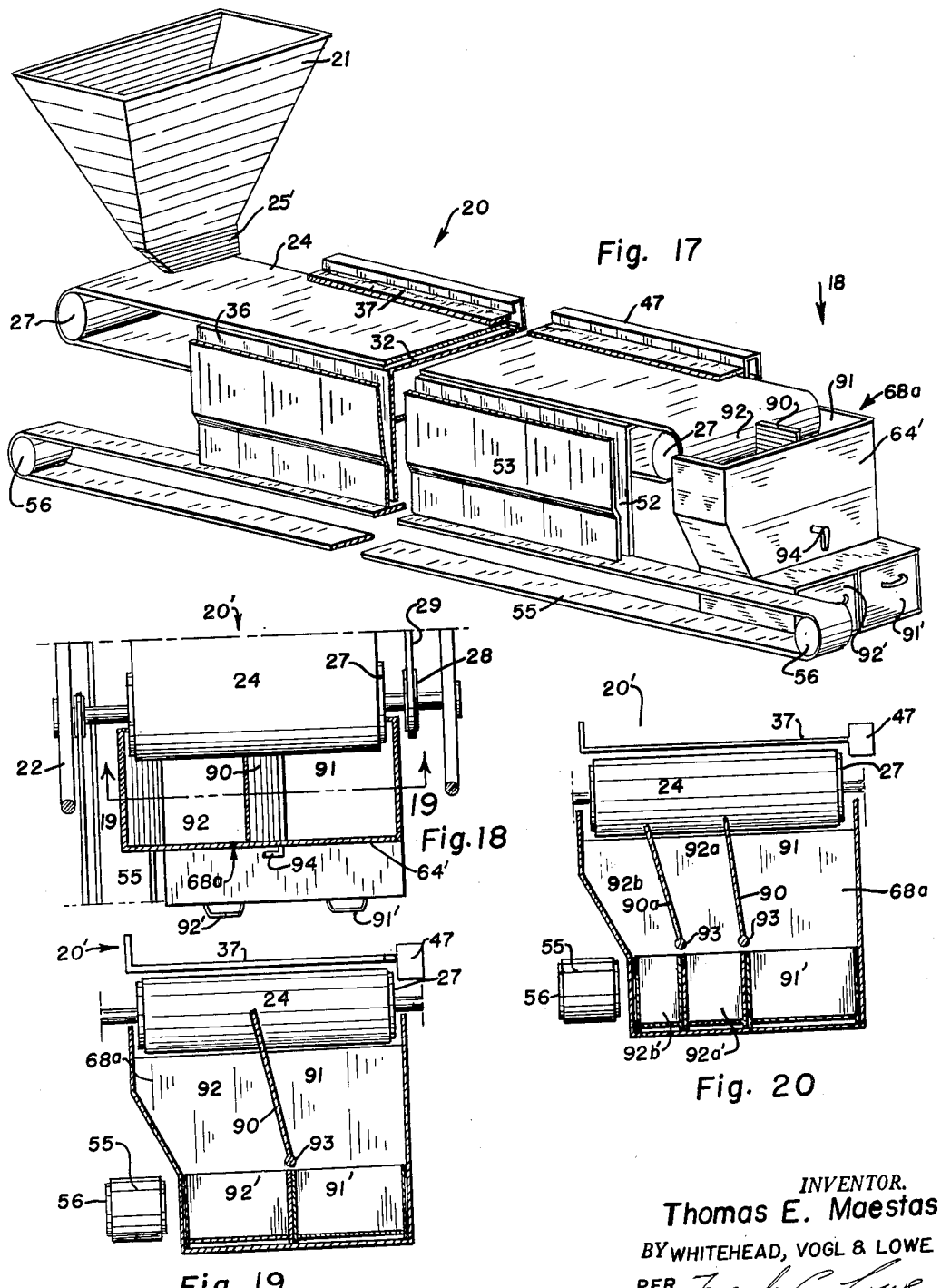

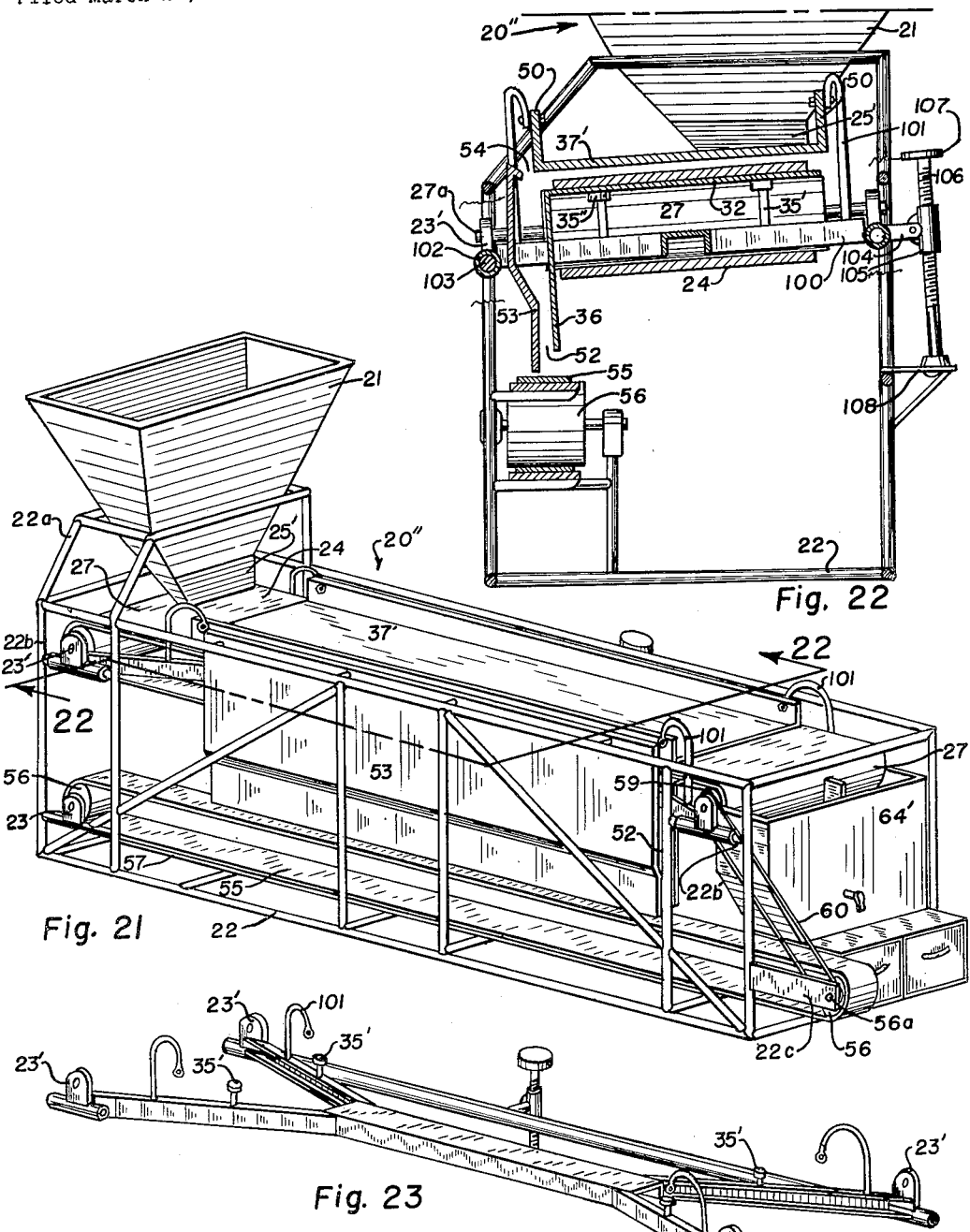

United States Patent Office 3,096,277
Patented July 2, 1963

3,096,277
ELECTROSTATIC SEPARATOR
Thomas E. Maestas, Colorado Springs, Colo.
Filed Mar. 27, 1961, Ser. No. 98,576
7 Claims. (Cl. 209—20)

This invention relates to the separation and the classification of comminuted material and more particularly to methods and apparatus for the separation and classification of particles of comminuted material which employ and include electrostatic excitation and force as a prime activator in the separation operation. Therefore, the invention will be hereinafter referred to as an electrostatic separator.

An object of the invention is to provide a novel and improved method and apparatus for the electrostatic separation of comminuted material which is adjustable to take advantage of one or more of several physical characteristics of the material to effect the separation and the classification thereof, including variation of density, conductivity and magnetic response and also, the variations of particle size that may occur.

Another object of the invention is to provide a novel and improved method and apparatus for the electrostatic separation of comminuted material which combines air flow action with electrostatic excitation in an operation to effectively winnow out various classes and types of particles in the comminuted material.

Another object of the invention is to provide a novel and improved method and apparatus for the separation and classification of comminuted material which combines electrostatic excitation with air flow, to effectively act upon and separate particles which have only slight variations in certain physical properties such as density.

Another object of the invention is to provide a novel and improved electrostatic separator which employs a winnowing air flow to shift and separate various types of particles as they are excited by the electrostatic action.

Another object of the invention is to provide a novel and improved electrostatic separator which is adapted to upgrade or concentrate comminuted material, and also may be used to completely separate different materials when desired.

Another object of the invention is to provide a novel and improved electrostatic separator which is especially adapted to combine an upgrading operation with a full separation of different materials, through a continuous recycling of the several operations.

A further object of the invention is to provide in an electrostatic separator which combines electrostatic excitation with air winnowing, novel and improved riffling and flow-dividing arrangements which are especially effective to hold and retain selected classes and types of particles of the material being treated.

Another object of the invention is to provide a novel and improved method and apparatus for the electrostatic separation of comminuted material which combines gravity forces with electrostatic excitation in a flowing action to separate various classes and types of particles in the comminuted material.

Still further objects of the invention are to provide a novel and improved method and apparatus for electrostatic separation of comminuted material which combines simple, easily-performed steps, is effective to rapidly handle comminuted material in commercial quantities, has a high percentage of recovery of valuable minerals, and is a simply constructed, economical, easily operated, neat and compact unit.

With the foregoing and other objects in view, all of which more fully hereinafter appear, my invention comprises certain improved sequences, operations, and steps; also parts, elements and constructions all as hereinafter described in detail, defined in the appended claims and illustrated in preferred embodiment in the accompanying drawing in which:

FIGURE 3 is a side elevational view of the unit, similar to the view at FIG. 1, but with portions being broken away to show parts and elements otherwise hidden from view.

FIGURE 4 is a transverse sectional elevational view as taken from the indicated line 4—4 at FIG. 3, but on an enlarged scale.

FIGURE 5 is a fragmentary sectional detail as viewed from the indicated arrow 5 at FIG. 4 but on a further enlarged scale and with portions being in section to show constructions otherwise hidden from view.

FIGURE 6 is a fragmentary plan view, partially in section, of the discharge end of the unit, as taken substantially from the indicated line 6—6 at FIG. 3, but on an enlarged scale.

FIGURE 7 is a side elevational view, partially in section, of the discharge end of the unit as taken substantially from the indicated line 7—7 at FIG. 6.

FIGURE 8 is a fragmentary transverse sectional portion, as taken from the indicated line 8—8 at FIG. 3 but on a greatly enlarged scale and being somewhat diagrammatic in nature to illustrate the primary operative elements of the unit.

FIGURE 9 is an isometric diagrammatic view of the primary components of the machine arranged in their operative order, with portions of elements being broken away to show other elements which would be otherwise hidden from view, with the outline of broken-away elements being shown by broken lines and with arrows indicating the movement of carrier belts, airflow and comminuted material.

FIGURE 10 is an enlarged isometric, sectional view of a fragment of the carrier belt illustrated at FIG. 8.

FIGURE 11 is an isometric, sectional view of a transverse portion of a carrier belt similar to that illustrated at FIGS. 1–10 but showing another pattern of riffle forms.

FIGURES 12 through 15 are enlarged, isometric, sectional views of fragments of carrier belts similar to that illustrated at FIGS. 1–10 but showing further alternate riffle forms.

FIGURE 16 is a plan view of a portion of a carrier belt similar to the type illustrated at FIGS. 1–10 but showing a further alternate arrangement of riffles thereon.

FIGURE 17 is an isometric, diagrammatic view similar to FIG. 9, showing certain primary components of the machine, with portions of elements being broken away to show other elements, and showing further a modified form of separating and particle receiving means.

FIGURE 18 is a plan view of an end portion of the organization illustrated at FIG. 17, as from the indicated arrow 18 at FIG. 17.

FIGURE 19 is a fragmentary sectional, elevational view as taken from the indicated line 19—19 at FIG. 18.

FIGURE 20 is a fragmentary sectional, elevational view similar to FIG. 19, but showing a further modification of the separating elements thereof.

FIGURE 21 is an isometric view of a further modified form of the apparatus which is especially adapted for combining electrostatic and gravitational forces in separating actions.

FIGURE 22 is a sectional, elevational view as taken substantially from the indicated line 22—22 at FIG. 21.

FIGURE 23 is an isometric view of a belt-carrying frame member of the organization set forth at FIGS. 21 and 22.

Figures 1, 2:
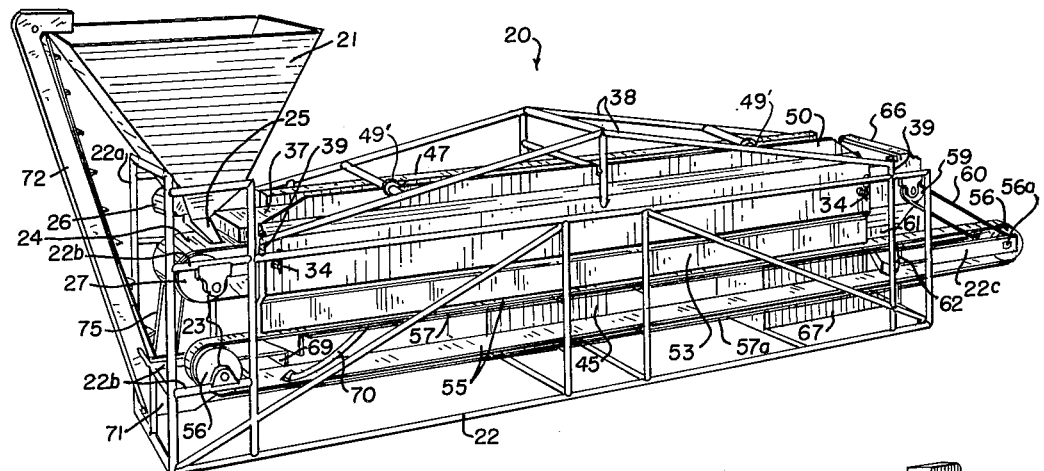
FIGURE 1 is a perspective view of the improved electrostatic separator looking towards one side thereof.
FIGURE 2 is a perspective view of the separator looking towards the opposite side thereof.

In the art of separating and classifying comminuted material, where the operations involve more than simple screening, the industry has relied primarily upon hydraulic methods involving operation such as froth flotation, sluicing or jigging. Although there has always been a need for dry separation and there have been many attemps to perfect apparatus and methods for dry separation, the very few effective dry separators that have been developed are limited in their application to material where the valuable constituent, hereinafter called the ore or concentrate, is much heavier than the waste sand or other material, hereinafter called the gangue. In the use of air separators which operate in a manner akin to sluicing, the air density is so low that separation must be effected entirely by turbulent effects of air flow and it is not a medium which is capable of drastically reducing the relative density of the lighter particles compared with heavier particles as is possible with hydraulic sluicing. Thus air separation is feasible for only very heavy materials such as with gold, and where the ore particles are substantially as large as the gangue particles.

Apparatus has also been developed to separate particles by magnetic methods and to separate particles electrostatically. Electrostatic apparatus has been used more for purposes related to classification and dispersion of fibre and lint particles than for mineral separation although exemplary of the present art of mineral separation by electrostatic methods is the Patent No. 2,689,648, issued to me by the United States Patent Office on September 21, 1954. This patent discloses a method based upon passing comminuted material through an electrostatic field of alternating potential sufficient to cause non-metallic particles of high dielectric strength to separate and stratify themselves into a layer above heavier particles of low dielectric strength, usually metallic particles. Separation of the layers is then effected to complete the process. Such apparatus and method is valuable for the upgrading or concentration of the metallic materials but is necessarily of limited application. Recognizing the need for improved methods and apparatus for dry separation and classification of comminuted material and for improvements over my Patent No. 2,689,648, the present invention was conceived and developed and comprises, in essence, an electrostatic separator which agitates a flow of comminuted material by electrostatic impulse and at the same time imposes a lateral air flow or other physical impulse, such as gravity, to winnow or otherwise separate the material as it is being agitated. The invention thus includes in its concepts a means for separating particles by properly taking advantage of several characteristics of the materials on hand, such as density, conductivity and the size of the particles.

Referring more particularly to the drawing, the electrostatic separator 20 is formed generally as an elongated, horizontally-disposed unit adapted to receive comminuted material from one end thereof as into a hopper 21 and to move the material longitudinally therethrough for ultimate discharge at the opposite end thereof. The movement of material is upon conveyor belts as hereinafter described. This apparatus is formed within a suitable skeletal framework 22 consisting of longitudinal, transverse, upright and diagonal members, all in the general form of an open-top, open-end box. Suitable uprights 22a at one end of the framework form a support for the hopper 21 upon the main portion of body. Other frame members 22b and extensions 22c form struts and mountings for shaft bearings 23 wherein conveyor-belt roller shafts are mounted. Still other body members are provided for carrying and supporting other elements of the apparatus as hereinafter described.

The discharge flow of material from the hopper 21 is onto one end of a primary conveyor belt 24 which is sufficiently wide to accommodate a layer of comminuted material for subsequent separation thereon, the width in the unit herein described being preferably 18 to 24 inches. It is desirable to flow the material on the top surface of this belt as it is moving to form a continuous layer of uniform depth. To do this, the spout 25 of the hopper 21 is formed as a transverse slot immediately above the receiving end of the belt. Also, to insure the desired uniform flow of material the hopper 21 includes a feed means such as a vibrator 26.

The primary conveyor belt 24 extends longitudinally through the machine and this belt is carried upon and about a pair of transverse rollers 27, one at each end of the machine. The rollers are carried upon shafts 27a which are mounted in appropriate bearings 23 carried by the frame 22. The shaft 27a of the roller at the discharge end of the belt also includes a driven pulley 28 which is operatively interconnected by a belt 29 with a drive pulley 30 of a drive motor 31. The drive motor 31 is mounted underneath the belt in any suitable arrangement as upon a framework case hereinafter described. It follows that the operation of the primary conveyor belt 24 by the motor 31 pulls the upper surface of the belt from the hopper end to the discharge end of the machine with the frictional drag of the belt causing this surface to be under tension and held flatly without wrinkling.

The reach of the upper surface of this belt between the rollers is also supported upon a flat, horizontally-disposed, rectangular carrier plate 32 which is slightly wider than the belt and is sufficiently long to extend over a substantial portion of the belt reach between the rollers 27. This carrier plate is mounted upon a pair of transversely disposed struts 33 and each end of each strut is preferably, but not necessarily, adjustably attached to the frame 22 as by a hanger bolt 34. The carrier plate 32 will form an electrode for electrostatic operation and it must be insulated from contact with the other parts of the machine except the belt which is made of rubber or similar insulating material. Therefore, the plate 32 is connected by the carrier struts 33 by insulators 35 upstanding from the struts. The carrier plate 32 will also include a downturned, drop skirt 36 at the side-discharge-edge of the belt, as hereinafter described, and insulators 35a will be positioned in this drop skirt 36 where the struts 33 necessarily pass through the skirt.

To produce electrostatic activity upon the surface of the primary conveyor belt 24 a second electrode plate 37, similar in form and size to the carrier plate 32, is mounted above the upper surface of the carrier belt in substantial spaced parallelism therewith. This upper electrode plate 37 is carried by and between two longitudinally disposed A-frame members 38 mounted upon the top of the frame 22, and is suitably insulated from these members to prevent the electrostatic charge from being grounded. The legs of the A-frame 38 are adjustably supported upon the body frame members 22 and the extended end of each leg terminates as an upright threaded head 39 through which an adjusting bolt 40 extends for connection into a suitable socket 41 in the frame 22 as clearly illustrated at FIG. 5. Adjustments of these bolts 40 will change the spacing between the belt surface and the upper plate 37 in any manner desired.

A technician skilled in the art can devise and arrange a power source adapted to impose an alternating electrostatic potential between the electrode plates 32 and 37, and through experimentation a desired voltage, frequency and wave form can be selected to best excite and separate any given combination of materials being treated. When an electrostatic potential is imposed between the plates, the conveyor belt 24 necessarily forms a dielectric surface between the electrode plates. It is thus desirable that this belt 24 be made of a good grade of rubber or like material having desirable dielectric properties. Also, as a further modification, the carrier plate 32 and a portion of the skirt 36 depending therefrom may be covered with a coating of plastic material such as the materials commonly known to the trade as nylon or Teflon. Such a covering is not shown in the drawing since it is a comparatively thin coat upon the surface of the plate 32 and not easily illustrated. However, such a covering is useful especially along the edge of the carrier plate 32 where the skirt 36 turns downwardly. Also, such a covering will reduce the frictional drag on the belt 24.

The electrical connections to the apparatus are conventional and may be comparatively simple but well insulated conduits. A first wire 42 is suitably connected to the upper plate electrode 37 of the apparatus and a second wire 43 is connected to the carrier plate electrode 32. These wires extend from a suitable control box 44 illustrated at FIG. 2. Power wires to connect with the control box 44 and to drive the motor 31 and other motors used with the apparatus are not illustrated since such wires will be conventional, and generally arranged in a conventional manner.

In operation of this unit, the electrostatically excited material upon the moving belt will stratify itself generally into layers depending upon the density, conductivity and size of the particles. Heavy metallic particles which are comparatively insensitive to the electrostatic action will be sifted to the bottom of the layer as in the manner disclosed in my prior patent. However, in the present invention means are provided to treat the material further by inciting transverse flow of some components on the belt. In the units illustrated at FIGS. 1 to 20, this is accomplished by an air flow movement transversely across the belt path to shift the particles on the belt laterally as they are excited by the electrostatic action. In the unit illustrated at FIGS. 21, 22 and 23, this is accomplished by gravity by imposing a side tilt of the belt as hereinafter described.

In the units illustrated at FIGS. 1 to 20, in the drawing this air-flow shift is from right to left of the viewer when viewing the apparatus from the discharge end and toward the head end thereof and the sides of the apparatus will thus be so designated. An air blower 45 is mounted within the frame underneath the carrier belt near the center of the unit and an air duct 46 extends from each side of the blower 45 to the quarter points of a longitudinally extending manifold 47 which is mounted on the right side A-frame member 38 alongside the conveyor belt 24. The manifold 47 is made as a box-shaped member with a longitudinal discharge slot 48 at the inner wall thereof and with the upper portion of this inner wall, above the slot 48 being interconnected to the right longitudinal side edge of the upper electrode 37 as by an insulator strip 49, to support that side of the electrode while the opposite side of the electrode is reinforced by an upturned flange 50 connected to its A-frame by an insulator 49'.

Each duct 46 of the blower includes a suitable regulating valve which is operable by an adjusting handle 51 at the blower to permit a variation of air flow to each end of the belt reach. If desired, the manifold 47 may also be divided at the center of the unit so that air flow to one end thereof will be independent of the air flow to the other end thereof.

Material moved laterally across the belt by air action will be discharged from the left side thereof and will drop over the edge of the carrier plate 32 and down a longitudinally disposed dropway 52 which is formed by the carrier-plate drop skirt 36 and a confining skirt 53 carried on the left-side A-frame 38 outwardly of the drop skirt 36. This confining skirt 53 is separated from the upper electrode 37 by a longitudinally extended relief slot 54 which permits an escape of air in an upward direction while the material from the conveyor belt will fall downwardly through the dropway 52 and upon a discharge belt 55, so designated because in ordinary operations it will be the comparatively worthless gangue which will be picked up by the lateral flow of air and be deposited upon this belt 55.

The discharge belt 55 is comparatively narrow and is located at the heretofore-designated left side of the unit underneath the side edge of the conveyor belt 24 and in spaced parallelism therewith. It is mounted upon suitable rollers 56 having their shafts 56a mounted in suitable frame bearings 23. The head end of the discharge belt is underneath the hopper but the discharge end of the belt is extended from the end of the frame 22 as by extensions 22c to drop gangue at a point away from the discharge end of the machine. The reach of the top surface of the discharge belt between rollers 51 is supported against sagging as by plates 57. Support plates 57a are also provided to prevent the reach of the lower portion of the belt from sagging since material is returned via this lower belt reach in a recycling operation as hereinafter described. The discharge belt 55 is operatively interconnected with the conveyor belt to move in unison therewith by a driven pulley 58 on the discharge roller shaft 56a, a drive pulley 59 on the discharge roller of the shaft 27a of the conveyor belt and a pulley belt 60 interconnecting the pulleys.

The material remaining upon the conveyor belt 24 and not blown away will ordinarily be the desirable ore which is to be saved or it will be a concentrate of ore and some of the gangue. This ore or concentrate remaining upon the conveyor belt will be carried over the discharge roller 27 to fall into suitable receiving compartments below the roller in the frame of the unit. In ordinary operations it is desirable to adjust the air flow and the electrostatic strength in such a manner as to leave a portion of the gangue on the belt to minimize the loss of valuable constituents and this gangue which is retained as a concentrate on the belt will be located adjacent to the discharge edge of the conveyor belt. This retained concentrate is dropped into a side compartment 61 which merges into an enclosed chute 62 having a discharge spout 63 at its base which is directed into the lower return reach of the discharge belt 55 for recycling of the concentrate as hereinafter described.

The other separated materials remaining upon the conveyor belt 24 may be further separated. One type of separation or classification will be according to the magnetic responsiveness of some of the material and may be separated accordingly. This construction is illustrated at FIGS. 1 to 9. The ore-receiving compartment below the main portion of the belt is formed as a generally enclosed chute structure 64 having an internal dividing partition 65 adjacent to the end of the roller 27. A magnet 66 is transversely disposed above this dividing partition so that when the magnet is energized, the magnetic-responsive particles will be pulled away from the roller as they fall to drop into the chute at the outward side of the dividing partition. This portion of the chute terminates as a receiving bin 67 for magnetic particles. The portion of the chute next to the roller 27 terminates as a receiving bin 68 for non-magnetic particles. Each bin is provided with a suitable drawer 67a and 68a respectively for easy removal of the materials collected therein although they could be extended or modified in any desired manner. It is to be noted that the drive motor 31 may be suitably mounted as upon bin 67, as illustrated, which is one convenient location for it.

The concentrated material from chute 62 which is deposited on lower return reach of the discharge belt 55 is carried towards the hopper end of the apparatus and to a pick up end of the receiver 69 underneath the hopper at the left side of the apparatus. The material is moved from the belt and into this receiver 69 as by air flow as from air pipe 70. The receiver 69 terminates as a collector bin 71 and a conveyor 72 extends upwardly from this bin 71 to the top of the hopper. Suitable power means drive the conveyor and it is preferably interconnected with the conveyor belt 24 by a drive pulley 73 on the shaft 27a, and a driven pulley 74 at the base shaft of the conveyor which are interconnected by a pulley belt 75. The conveyor operates to move material upwardly from the bin 71 for discharge into the right side of the hopper 21, as illustrated to better permit the material forming this residual concentrate to be deposited adjacent to the blower to give the ore particles in the concentrate a better chance of remaining upon the belt during a subsequent pass along the belt.

The operation of the particles on the conveyor belt is essentially an up and down agitation responsive to an alternating electrostatic force. To this action there is added a lateral winnowing action of air flow. It was discovered that if the conveyor belt surface was formed with longitudinal continuous grooves 76, there was a far more effective differentiation between one material and another.

Air flow variations occur at the grooves but there is also a distinct change of electrostatic intensity due to changed belt thickness at the grooves. The electrostatic charge is sensitive to slight changes in the thickness of a dielectric material such as a belt, and the changes of the behavior of the grooves is not fully understood but particle movements definitely change at the grooves.

It was further discovered that a preferred arrangement of grooves was to place more grooves adjacent to the side discharge edge of the belt, as in the manner illustrated at FIG. 8.

Subsequent tests were made with triangular ridges 77 such as illustrated at FIG. 11. It was further discovered that a preferred type of belt contour for some materials was a series of longitudinally disposed spaced rolls 78 such as illustrated at FIG. 12. Yet other surfaces were tested and discovered to possess desirable properties in retaining the ore of a comminuted material including a streamlined ridge form 79 such as illustrated at FIG. 13, rectangular slots 80 as illustrated at FIG. 14, and a serrated surface 81 as illustrated at FIG. 15.

A certain amount of skill is necessary for the proper selection of a groove or ridge pattern on the belt. The natural arrangement was to provide a series of grooves or ridges on the belt in a continuous, longitudinal array. It was also discovered that other groove and slot arrangements could be formed on the belt surface which would operate advantageously with certain types of materials. One of these groove arrangements especially effective is the hyperbolic arrangement of grooves 82 as illustrated at FIG. 16.

In moving comminuted material having several components of the type which would remain upon the belt 24, it was discovered that not only could these components, the ore, be separated from lighter components, the gangue, by removing the gangue from the belt, but also that these components themselves could be separated while remaining on the belt with one component lying at one side of the belt and the other component moving partially across the belt.

It is necessary to modify the apparatus 20' in minor detail to accomplish this action, as in the manner illustrated at FIGS. 17 to 20. The spout 25' of the hopper 21 is offset to deposit material at the right side of the belt 24, so that it must move laterally across the belt to discharge from the left side thereof.

Also, the ore receiving compartment is modified, and in the units illustrated at FIGS. 17 to 20, the concentrate compartment 61, return chute 62 and magnetic receiving bin 67, heretofore described, are optionally eliminated. In the unit illustrated at FIGS. 17 to 19, the modified compartment 64' is a single receiving bin 68a having an upright, longitudinally disposed splitter or divider 90 mounted below the roller 24 to divide the receiving bin 68a into two compartments 91 and 92 with suitable drawers 91' and 92' at the base of each compartment to recover the material dropping therein.

This divider 90 may be fixed or adjustable as by mounting it upon a pivot 93 at its base with a handle 94 extending outside the wall of the compartment 64' to facilitate adjustment thereof.

In the unit illustrated at FIG. 20, the compartment 92 may be further divided into two sections 92a and 92b by a second divider 90a, which is suitably mounted upon a pivot 93 as described.

The operation of the apparatus is evident from the foregoing description. A selected body of comminuted material which is treated is prepared for passage through the apparatus as by preliminary screening and by assays in any ordinary manner to determine the nature of the constituents thereof and the nature of the ore components which will be recovered. After screening the material, the apparatus may be first used to merely concentrate the material, if desired, by a rapid deposit of material on the conveyor belt 24 and by adjustment of the air flow to a point where a substantial proportion, but not all of the waste material is blown away and the remaining material is the concentrate. This concentrate, or the original material if concentration is not desired, is then passed through the machine with the machine set to provide selected steady movement of material from the hopper and onto the conveyor belt 24, a selected steady air flow across the belt, and a selected alternating electrostatic charge between the electrode plates 32 and 37, all depending upon the type of material being treated. A skilled operator can determine what flows and charges are needed by preliminary tests and adjustments of the apparatus. The apparatus will usually be adjusted to leave a portion of the gangue at the discharge edge of the conveyor belt, which will be recirculated as a concentrate to return to the hopper. When the run is commenced it may continue as long as material is being supplied to the hopper, and the drawers 67a and 68a may be periodically removed to recover the ore constituents or concentrates therein.

The apparatus may further be modified to eliminate the air blower and to depend upon gravity to effect a lateral shifting of selected components of material across the belt by tipping the belt about it longitudinal axis. One such apparatus to accomplish this action is illustrated at FIGS. 21 to 23. In this unit 20" the framework 22 is substantially the same as that heretofore described, being modified only by providing means to support the elements for tipping the belt 24 and to eliminate the air blower means.

In this modified unit, the belt 24, the rollers 27, the electrodes 32 and 37 and the skirt 36 depending from the supporting electrode 32 are all mounted upon a swing frame 100 which, in turn, is pivotally carried upon the main frame 22. This frame 100 is preferably a simple flat X-shaped structure which is adapted to lie between the upper and lower reaches of the belt 24 with each end of the X-shaped frame 100 carrying upstanding bearings 23' wherein the shafts 27a of the rolls 27 are carried to support the rollers and belt. Thereon, suitable upstanding insulators 35' support the lower plate 32 and insulated hangers 101 upstand from the corners of the plate to support and hold the upper plate 37', the hangers being preferably connected to upturned reinforcing flanges 50 and 50' at the edges of the upper electrode 37' at each side of the belt path. One side of this swing frame 100 is mounted to the unit frame 22 by a pair of horizontally-disposed axially-aligned hinge bearings 102 at the extended ends of the X-formed bars, the hinges being carried in suitable pintle units 103 mounted on the frame 22. The opposite side frame is supported by a jack means adapted to provide elevational adjustment in the form illustrated, an arm 104 outstands from the frame 100 and connects a threaded sleeve 105. An upright jack screw 106 having a suitable handle 107 depends through the sleeve to rest upon an abutment 108 on the unit frame 22.

With this structure the surface of the belt 24 may be tilted sidewise at any selected angle by adjustments of the jack screw 106 so that material agitated by electrostatic force will flow from the side of the belt and then through the dropway 52 and onto the discharge belt. Other material remaining upon the belt will be deposited into the ore receiving compartment 64'. In this tilted unit it is further desirable to deposit material to the right or high side of the belt as by shifting the spout 25' as hereinbefore described.

While I now have described my invention in considerable detail, it is obvious that others skilled in the art can devise and build alternate and equivalent constructions which are within the spirit and scope of my invention, and hence, I desire that my protection be limited, not by the constructions illustrated and described but only by the proper scope of the appended claims.

I claim:

1. In apparatus for the electrostatic separation and classification of comminuted material of the type having an endless primary conveyor belt whose upper surface is adapted to move from a receiving terminal to a discharge terminal, means at the receiving terminal adapted to deposit material upon the upper surface of the belt, means at the discharge terminal adapted to receive material dropping from the belt, means in the belt reach between the terminals including electrode plates above and underneath the upper surface of the belt adapted to create an alternating electrostatic field on the belt surface with an intensity sufficient to agitate and lift electrostatically sensitive particles from the belt surface and means adapted to initiate a transverse movement of the lifted particles and shift them laterally across the belt and over the side thereof, and including in combination therewith, a series of generally longitudinally disposed riffles on the belt surface adapted to interrupt the lateral flow of particles to the side of the belt.

2. In the combination defined in claim 1, wherein the riffles are formed as members upstanding from the surfaces of the belt and with the spacing of the riffles being comparatively close adjacent to the overfall side of the belt and apart over the other portions of the belt.

3. In the combination defined in claim 1, wherein the particle shifting means includes means adapted to create a transversely directed air blast above the belt surface and wherein the riffles are generally sloped in the direction of the air blast as a streamlined ridge.

4. In apparatus for the electrostatic separation and classification of comminuted material of the type having an endless primary conveyor belt whose upper surface is adapted to move from a receiving terminal to a discharge terminal, means at the receiving terminal adapted to deposit material upon the upper surface of the belt, means at the discharge terminal adapted to receive material dropping from the belt, means in the belt reach between the terminals including electrode plates above and underneath the upper surface of the belt adapted to create an alternating electrostatic field on the belt surface with an intensity sufficient to agitate and lift electrostatically sensitive particles from the belt surface, means adapted to initiate a transverse movement of the lifted particles and shift them laterally across the belt and over the side thereof, and including in combination therewith, a longitudinally disposed, channel-shaped dropway along the overfall side of the belt adapted to receive particles dropping over the side thereof having vertically disposed skirts as sidewalls; a continuous discharge belt having a reach substantially that of the primary belt, whose upper surface forms the floor thereof, which is adapted to move in the same direction as the primary belt and move the dropped particles dropping thereon over a discharge end, said means at the discharge terminal of the primary belt including a chute adapted to receive particles lying on the belt adjacent to the overfall edge thereof and to deposit the particles, upon the under reach of the discharge belt to permit them to return to the receiving end of the apparatus and means adjacent to the receiving end adapted to remove the particles from the under reach of the discharge belt and to deposit them onto the primary belt at the receiving terminal.

5. In the combination defined in claim 1 wherein the riffles are formed as channels extending into the surface of the belt.

6. In the combination defined in claim 1 wherein the riffles are formed as members upstanding from the surface of the belt.

7. In the combination defined in claim 1, wherein the riffles are formed in a generally hyperbolic arrangement, with each riffle curving from a substantially transverse alignment across the belt to a substantially longitudinal alignment adjacent to the overfall side of the belt.

References Cited in the file of this patent

UNITED STATES PATENTS

| | | |
|---|---|---|
| 1,355,477 | Howell | Oct. 12, 1920 |
| 2,414,993 | Wiegand | Jan. 28, 1947 |
| 2,689,648 | Maestas | Sept. 21, 1954 |
| 2,754,965 | Lawver | July 17, 1956 |
| 2,926,428 | Adam | Mar. 1, 1960 |

OTHER REFERENCES

Mine and Quarry Engineering, July 1941, page 198.